US007148741B2

(12) United States Patent
Berger et al.

(10) Patent No.: US 7,148,741 B2
(45) Date of Patent: Dec. 12, 2006

(54) CURRENT SUPPLY CIRCUIT AND METHOD FOR SUPPLYING CURRENT TO A LOAD

(75) Inventors: Stefan Berger, Bodensdorf (AT); Harald Koffler, Villach (AT)

(73) Assignee: Infineon Technologies AG, Munich (DE)

( * ) Notice: Subject to any disclaimer, the term of this patent is extended or adjusted under 35 U.S.C. 154(b) by 114 days.

(21) Appl. No.: 10/953,469

(22) Filed: Sep. 29, 2004

(65) Prior Publication Data

US 2005/0127968 A1 Jun. 16, 2005

(30) Foreign Application Priority Data

Sep. 29, 2003 (DE) ................................ 103 45 235

(51) Int. Cl.
*H02M 3/156* (2006.01)

(52) U.S. Cl. ....................................... 327/538; 307/140

(58) Field of Classification Search ................ 327/538, 327/540, 541, 543; 307/31–33, 35, 52, 60, 307/80, 140

See application file for complete search history.

(56) References Cited

U.S. PATENT DOCUMENTS

| | | | | |
|---|---|---|---|---|
| 4,502,152 A | | 2/1985 | Sinclair | 455/73 |
| 4,930,040 A | | 5/1990 | Binarsch et al. | 361/154 |
| 5,731,731 A | * | 3/1998 | Wilcox et al. | 327/403 |
| 6,351,162 B1 | * | 2/2002 | Schwartz | 327/110 |
| 6,737,839 B1 | | 5/2004 | Hiraki et al. | 323/268 |
| 6,975,162 B1 | * | 12/2005 | Tamura et al. | 327/538 |

FOREIGN PATENT DOCUMENTS

| | | |
|---|---|---|
| DE | 38 13 066 A1 | 11/1988 |
| DE | 37 41 765 A1 | 6/1989 |

* cited by examiner

*Primary Examiner*—Timothy P. Callahan
*Assistant Examiner*—Terry L. Englund
(74) *Attorney, Agent, or Firm*—Maginot, Moore & Beck

(57) ABSTRACT

A current supply circuit includes an input, a load terminal, a selectively activatable current regulator, a selectively activatable adjustable current source, and a comparator circuit. The input is configured to receive a first value signal. The load terminal is configured to provide a load current that is dependent on the first value signal. The current regulator is operable to, when activated, cause a first current to be provided through the load based on the first value signal. The adjustable current source is operable to, when activated, cause a second current to be provided through the load based on the first value signal. The comparator circuit is operable to generate a comparison of the first value signal and a second value signal, and is further operable to cause selective activation of one of the current regulator or the adjustable current source based on the comparison.

20 Claims, 5 Drawing Sheets

CURRENT SUPPLY CIRCUIT AND METHOD FOR SUPPLYING CURRENT TO A LOAD

FIELD OF THE INVENTION

The present invention relates to a current supply circuit and a method for supplying current to a load.

BACKGROUND

Current supply circuits having current regulating arrangements which provide a load current depending on a desired value signal are sufficiently known. DE 37 41 765 A1 and DE 38 13 066 A1 in each case describe such current regulating arrangements formed as switching regulators.

For current regulating purposes, current regulating arrangements of this type require a detection of the load current flowing through the load. Particularly in the case of current regulating arrangements provided with a large operating range, a high resolution and a high accuracy, the need arises to accurately detect the load current actually flowing. This problem emerges particularly for the "lower" operating range where small currents are made available whose values amount to only a fraction of the largest possible currents at the "upper" end of the operating range. In this case, for exact detection of the load current, it is necessary to work with external, high-precision components since circuit elements in integrated circuits achieve the desired accuracy and resolution only with a considerable trimming outlay. However, these external components contribute to increasing the production costs.

In the case of current regulators formed as switching regulators in which a semiconductor switch is opened and closed in a clocked manner for the purpose of supplying current to the load, the current measurement is additionally made more difficult since a high-frequency signal resulting from the clocked driving of the switch is in this case superposed on the load current. The influence of this high-frequency signal on the measurement signal rises as the load current decreases, that is to say the influence increases in the lower operating range.

In the case of current regulating arrangements known heretofore, regulation in the lowermost current range has therefore been dispensed with, or the corresponding resolution and accuracy have been adapted to the measurement accuracy technically possible.

It is an aim of the present invention to provide a current supply circuit for a load and a method for supplying current to a load in which a supply of current to the load is ensured over a wide operating range, in particular even with small currents, with a precisely adjustable load current.

SUMMARY

This aim is achieved by a current supply circuit and a method for supplying current to a load in accordance embodiments of the invention.

The current supply circuit according to the invention comprises an input for feeding a desired value signal and a load terminal for connecting a load and providing a current through the load, said current being dependent on the desired value signal. The current supply circuit has an activatable and deactivatable current regulating arrangement, which is connected to the output terminal and to which the desired value signal and a current measurement signal dependent on the load current are fed and which, in the activated state, brings about a regulated load current through the load dependent on the desired value signal and the current measurement signal. Moreover, the current supply circuit comprises an activatable and deactivatable adjustable current source arrangement which is connected to the output terminal and, in the activated state, brings about a current through the load dependent on the desired value signal. For the activation and deactivation of the current regulating arrangement and the current source arrangement, provision is made of a comparator arrangement, to which the desired value signal and a limit value signal are fed and which activates either the current regulating arrangement or the current source arrangement depending on a comparison of the desired value signal with the limit value signal.

In this case, the comparator arrangement is preferably formed in such a way that it activates the current regulating arrangement if the desired value signal lies above the limit value signal, and that it activates the current source arrangement if the desired value signal lies below the limit value signal. During the comparison of the desired value signal with the limit value signal, a hysteresis is preferably taken into account in order, in the case of values of the desired value signal which lie in the region of the limit value signal, to avoid a frequent changeover between the current regulating arrangement and the current source arrangement, and vice versa.

The current source arrangement is preferably formed as a current mirror arrangement having a first current path and a second current path coupled to the first current path, an adjustable current source being arranged in the first current path, the desired value signal being fed to said current source as setting signal. The second current path is coupled to the output terminal in order to bring about, in the activated state of the current mirror arrangement, a current through the load which, by means of the current mirror ratio, is dependent on the current provided by the current source. A current mirror arrangement of this type has an increased power loss compared with a current regulating arrangement, so that, in the case of large load currents, such a current mirror arrangement is already problematic owing to the evolution of heat associated therewith. This evolution of heat is less significant, however, in the case of small load currents and thus a small power loss seen in absolute terms.

The advantage of the present current supply circuit is that an exactly adjustable load current is made available for the load over a large operating range. In the upper operating range, that is to say in the case of desired values above the limit value prescribed by the limit value signal, the current is provided by the current regulating arrangement that is optimized with regard to its effectiveness for load currents in the upper operating range. In the case of small load currents, that is to say in the case of desired values below the limit value, the load current is provided by the unregulated current source circuit that supplies a precisely adjustable load current. Since both the current regulating arrangement and the current source circuit provide a load current dependent on the desired value, it is the case that when changing over from the current regulating arrangement to the current source arrangement and vice versa, the monotone nature of the load current is ensured, that is to say that no jumps occur in the load current during the changeover.

In one embodiment, the current regulating arrangement is formed as a switchable current regulating arrangement comprising a semiconductor switch having a load path and a control terminal, the load path being connected to the output terminal. Such a current regulating arrangement furthermore comprises a drive circuit, to which the desired value signal and the current measurement signal are fed and which provides a clocked drive signal for the semiconductor switch, the duration of switch-on periods of the drive signal being dependent on the desired value signal and the current measurement signal.

A regulator is present for providing said drive signal, which regulator provides a regulating signal from the desired value signal and the current measurement signal. Said regulator has a proportional action, integral action or a proportional-integral action. The regulating signal of the regulator is fed to a pulse width modulator that provides a pulse-width-modulated signal for driving the semiconductor switch with a pulse duration dependent on the regulating signal.

There are various possibilities for the activation and deactivation of the current regulating arrangement. One embodiment provides for a supply voltage of the current regulating arrangement to be switched off. In the case of a switching regulator, by way of example, the drive circuit providing the drive signal is switched off as a result of this and the switch is thereby deactivated.

Moreover, in the case of a switching regulator, there is the possibility of connecting a switch between the drive circuit and the semiconductor switch in order, when the switch has been opened, to deactivate the semiconductor switch and thus the current regulating arrangement.

For the activation and deactivation of the current source circuit, there is the possibility of either interrupting the voltage supply of the current source circuit or switching off the adjustable current source.

The method according to the invention for supplying a load with a load current dependent on a desired value signal provides for the provision of an activatable and deactivatable current regulating arrangement which, in the activated state, brings about a load current through the load that is regulated in a manner dependent on a desired value signal and a current measurement signal dependent on the load current. Moreover, provision is made of an activatable and deactivatable current source circuit which, in the activated state, brings about a current through the load dependent on the desired value signal. The desired value signal is compared with a limit value signal, either the current regulating arrangement or the current source arrangement being activated depending on the comparison result.

BRIEF DESCRIPTION OF THE DRAWINGS

The present invention is explained in more detail below using exemplary embodiments with reference to figures.

DETAILED DESCRIPTION

In the figures, unless specified otherwise, identical reference symbols designate identical structural parts and signals with the same meaning.

Figure 1:
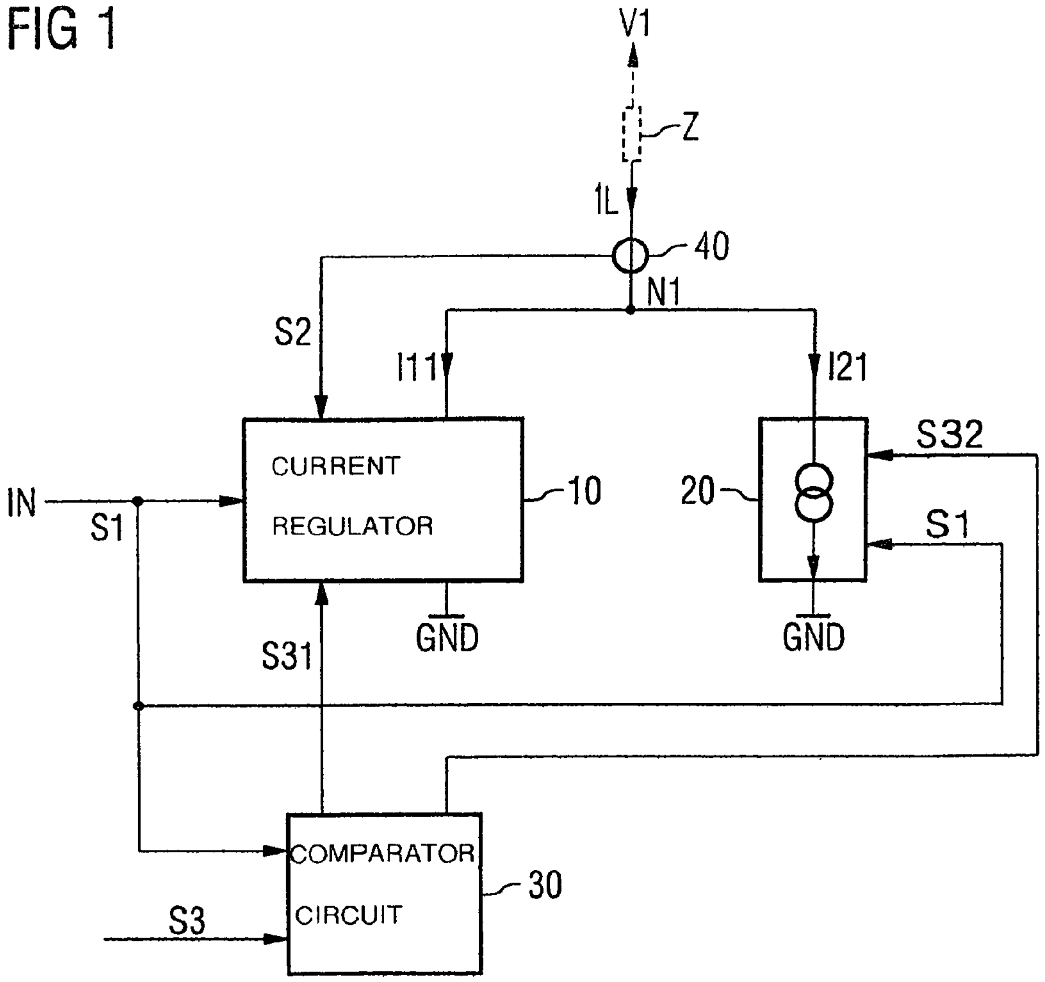
FIG. 1 schematically shows a current supply circuit with an activatable and deactivatable current source arrangement and an activatable and deactivatable current regulating arrangement for supplying current to a load.

FIG. 1 schematically shows a current supply circuit according to the invention having an input terminal IN for feeding a desired value signal S1, which prescribes the value of the current provided, and an output terminal N1 for connecting a load Z, which is illustrated by dashed lines in FIG. 1. The current supply circuit comprises an activatable and deactivatable current regulating arrangement 10, to which the desired value signal S1 is fed and which is connected to the output terminal N1 in order, in the activated state, to bring about a current I11 through the load Z dependent on the desired value signal S1. In the example illustrated, the current regulating arrangement 10 is connected between the output terminal N1 and reference-ground potential GND, while the load Z is connected between a positive supply potential V1 and the output terminal N1. It goes without saying that these potential conditions can also be interchanged.

In order to regulate the load current IL flowing through the load Z, which load current, when the current regulating arrangement 10 is activated, corresponds to the current I11 through the current regulating arrangement 10, the current regulating arrangement 10 is fed a current measurement signal S2 provided by a current measuring arrangement 40 connected into the load circuit.

The current supply circuit furthermore comprises an unregulated current source circuit 20 connected between the output terminal N1 and reference-ground potential GND in a manner corresponding to the current regulating arrangement 10. Said current source circuit 20 is likewise activatable and deactivatable and, in the activated state, brings about a current I21 through the load dependent on the desired value signal S1. Said desired value signal is fed to the current source arrangement 20 as a setting signal for setting the current I21 provided.

The current supply circuit additionally comprises a comparator arrangement 30, to which the desired value signal S1 and a limit value signal S3 are fed and which provides activation/deactivation signals S31, S32 for the current regulating arrangement 10 and the current source arrangement 20 depending on a comparison result between said two signals S1, S3, the comparator arrangement 30 being designed to activate only either the current regulating arrangement 10 or the current source arrangement 20 and to deactivate the respective other arrangement, depending on the comparison result.

The limit value signal S3 is coordinated in particular with the properties of the current regulating arrangement 10 in such a way that, in the case of desired values S1 that lie below the limit value signal S3, it is no longer possible to ensure a sufficiently accurate current supply by the current regulating arrangement 10. Therefore, in the case of desired values below the limit value signal S3, a changeover is made to the current source arrangement 20, which offers a high accuracy even in the case of small required load currents IL.

Figure 2:
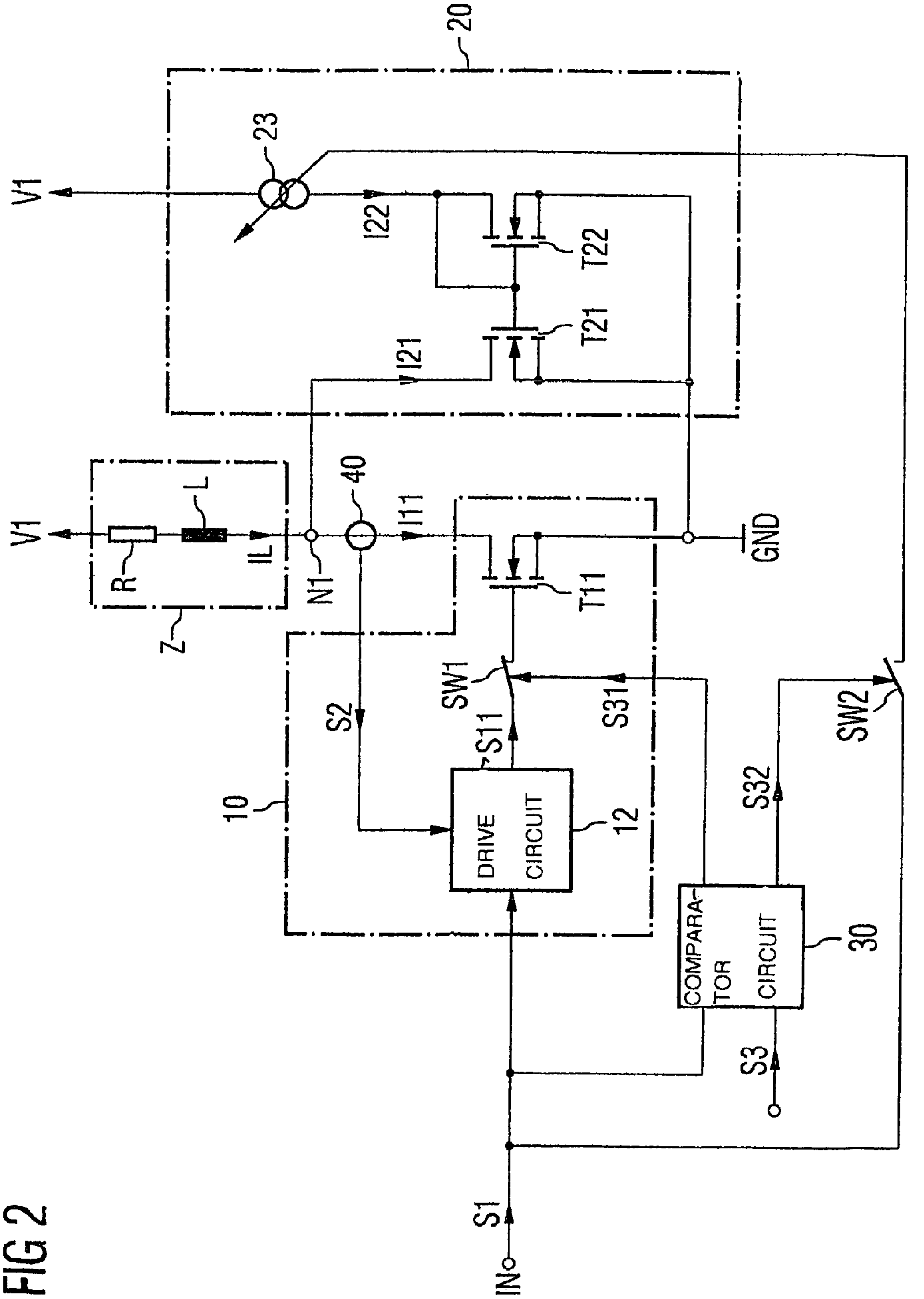
FIG. 2 shows an exemplary embodiment of a current supply circuit with a current regulating arrangement formed as a switching regulator and a current source arrangement formed as a current mirror arrangement.

FIG. 2 shows an exemplary embodiment of a current supply circuit in which the current regulating arrangement 10 is formed as a switching regulator and the current source arrangement 20 is formed as a current mirror arrangement. Such current regulating arrangements 10 formed as switching regulators are suitable in particular as current regulators for inductive loads, such as solenoid valves, for example. In FIG. 2, the series circuit formed by a resistor R and an inductance L is illustrated as an equivalent circuit diagram for such a load.

The switching regulator 10 comprises a semiconductor switch T11, which is formed as an n-conducting MOSFET in the example and the load path or drain-source path of which is connected between the output terminal N1 and reference-ground potential GND in order to regulate the current flow from supply potential V1 through the load Z to reference-ground potential GND.

A drive circuit 12 is provided for driving said semiconductor switch T11, which drive circuit supplies a clocked drive signal S11 at the drive terminal or gate terminal of the semiconductor switch T11. In order to generate said drive signal S11, the desired value signal S1 and the current measurement signal S2 are fed to the drive circuit 12. The drive signal S11 is a pulse-width-modulated signal whose duty cycle is dependent on the desired value signal S1 and the current measurement signal S2.

A switch SW1 is provided for activating or deactivating said switching regulator 10. The switch SW1 is connected between the drive circuit 12 an the drive terminal of the semiconductor switch T11 and, according to the activation/deactivation signal S31 supplied by the comparator arrangement 30, is opened in order to deactivate the switching regulator 10 or is closed in order to activate the switching regulator 10.

In the example in accordance with FIG. 2, the current source arrangement 20 is formed as a current mirror arrangement having a first current path and a second current path. The first current path comprises an adjustable current source 23 and a first current mirror transistors T22, which, in the example, is formed as an n-conducting MOSFET and is connected up as a diode. The second current path is formed by the load path of a second current mirror transistor T21, which is likewise formed as a n-conducting MOSFET, the gate terminals and the source terminals of the current mirror transistors T21, T22 in each case being connected to one another for the purpose of coupling the first and second current paths. The second current path that is to say the load path of the second current mirror transistor T21, is connected between the output terminal N1 and reference-ground potential GND in order, in the activated state of the current mirror arrangement, to bring about a current I21 from supply potential V1 through the load Z to reference-ground potential GND. This current I21 in the second current path is proportional to the current I22 supplied by the current source 23 in the first current path. The current I11 brought about through the load Z by the current regulating arrangement 10 is proportional to the desired value signal S2, the proportionality factor depending on the internal construction of the drive circuit 12. In order not to obtain any jump in the load current IL when changing over from the current regulating arrangement 10 to the current source arrangement 20, the proportionality factor specifying the proportionality between the load current I21 and the current source current I22 is preferably chosen to be identical to the proportionality factor of the current regulating arrangement 10. This proportionality factor of the current mirror can be set in a sufficiently known manner by means of the area ratio of the current mirror transistors T21, T22. If appropriate, it must be taken into account in this case that the current source current I22 does not usually correspond to the desired value signal S1, but rather is proportional to said desired value signal.

The current source 23 present in the first current path supplies the current I22 proportional to the desired value signal S1 in the first current path, which is mapped onto the current I21 flowing through the load by means of the current mirror transistors T21, T22.

In figure 2, a switch SW2 is provided for activating and deactivating the current mirror arrangement 20. The switch SW2 is connected upstream of the setting terminal of the current source 23, said switch being opened by the activation/deactivation signal S32 in order to deactivate the current source 23, and thus to set the current source current 122 to zero, and being closed in order to activate the current mirror arrangement 20 and thus to bring about a current 122 dependent on the desired value signal Si in the first current path.

Figure 3:
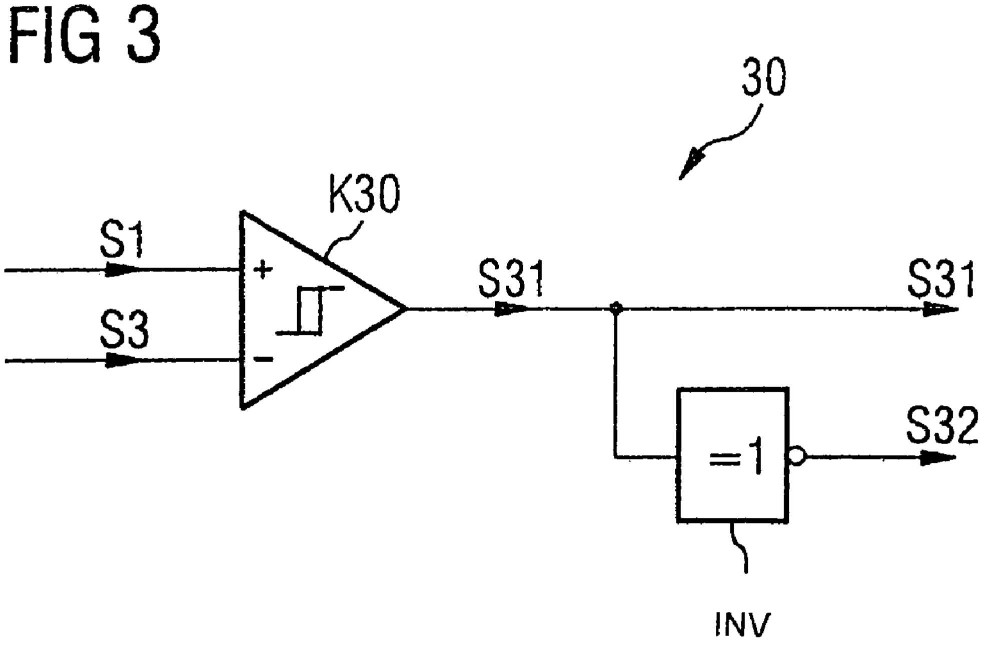
FIG. 3 shows an example of the realization of a comparator arrangement that activates and deactivates the current regulating arrangement and the current source arrangement.

FIG. 3 shows an exemplary embodiment of a comparator arrangement 30 having a comparator K30, to whose noninverting input the desired value signal S1 is fed and to whose inverting input the limit value signal S3 is fed. The comparator K30 provides a comparator output signal S31 corresponding to one of the two activation/deactivation signals, in the present case to the signal S31 that activates/deactivates the current regulating arrangement 10. The second activation/deactivation signal S32 is provided from the first activation/deactivation signal and by means of an inverting INV. The two signals S31, S32 are thus complementary to one another. As a result, only one of the two current supply arrangements, either the current regulating arrangement 10 or the current source arrangement 20, is activated at any one time.

The comparator K30 preferably has a hysteresis behavior in order, in the case of a desired value signal S1 lying in the region of the limit value signal S3, to prevent frequent, briefly successive changes in the comparator output signal S31, in order thereby to avoid a frequent, briefly successive changeover between the arrangements 10 and 20. This comparator circuit K30 may be realized in particular as a digital circuit.

An example of the realization of a drive circuit 12 for the switching regulator 10 in accordance with FIG. 2 is explained below with reference to FIGS. 4*a* to 4*d*.

Figure 4A:
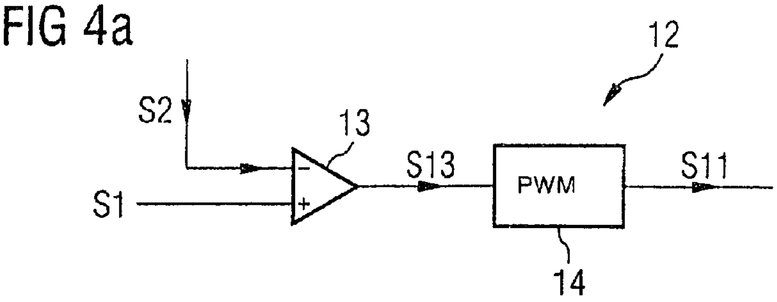
FIG. 4 shows an example of the realization of a drive circuit of a switching regulator with a regulator and a pulse width modulator in FIG. 4*a*, an example of the realization of the regulator in FIG. 4*b*, an example of the realization of the pulse width modulator in FIG. 4*c*, and selected signal profiles for elucidating the functioning of the pulse width modulator in FIG. 4*d*.

With reference to FIG. 4*a*, the drive circuit 12 comprises a regulator 13, to which the desired value signal S1 and the current measurement signal S2 are fed.

Said regulator has a proportional action, an integral action or a proportional-integral action and provides a regulating signal S13 dependent on the difference between the desired value signal S1 and the current measurement signal. Said regulating signal S13 is fed to a pulse width modulator 14 that provides a pulse-width-modulated signal as drive signal S11, the duty cycle of said pulse-width-modulated signal being dependent on the regulating signal S13.

Figure 4B:
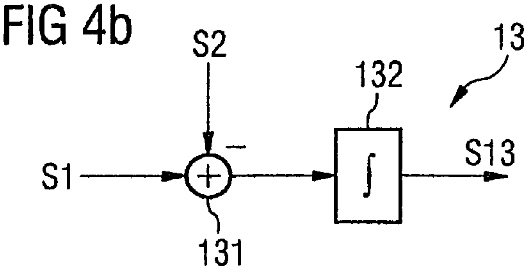

FIG. 4*b* shows an example of the realization of a regulator 13 with integral regulating action. This regulator comprises a differential element 131, which forms the difference between the desired value signal S1 and the current measurement signal S2, and an integrator 132, which is connected downstream of the differential element and provides the regulating signal S13.

Figure 4C:
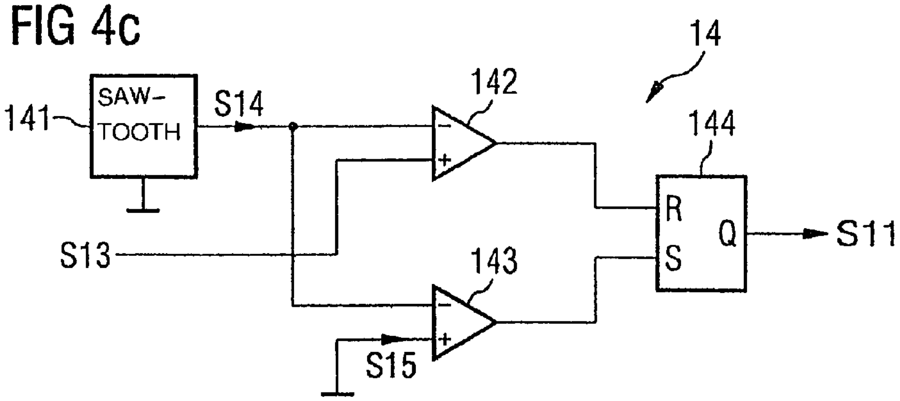

With reference to FIG. 4*c*, the pulse width modulator 14 comprises a sawtooth generator 141, which provides a sawtooth signal S14 that is fed to first and second comparators 142, 143. The first comparator 142 compares the sawtooth signal S14 with the regulating signal S13 and the second comparator 143 compares the sawtooth signal S14 with a reference signal S15. Connected downstream of the comparators 142, 143 is an RS flip-flop 144, at the output Q of which the pulse-width-modulated signal S11 is available. In this case, the first comparator 142 serves for resetting and the second comparator 143 serves for setting the flip-flop 144.

The functioning of this pulse width modulator in accordance with FIG. 4*c* is explained below with reference to FIG. 4*d*.

Figure 4D:
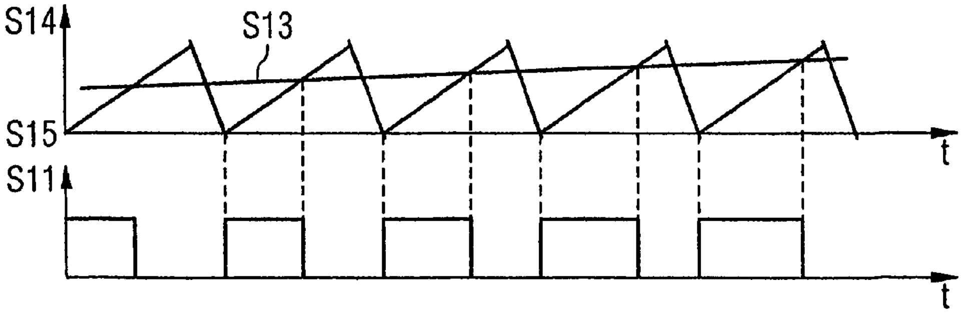

FIG. 4*d* shows, in an illustration one below the other, the temporal profile of the sawtooth signal S14 and also of a regulating signal S13, which rises over time in the example, and of the pulse-width-modulated signal S11. The flip-flop 144 is set in each case when the sawtooth signal S14 reaches the reference signal S15, as a result of which the pulse-width-modulated signal S11 rises to a high level. In this case, the flip-flop remains set until the sawtooth signal S14 exceeds the regulating signal S13. As can be seen from FIG. 4*d*, the pulse duration increases as the regulating signal S13 rises, in order in this way to increase the switch-on duration of the switch T11 (FIG. 2) and thereby to increase the current flow.

In this case, a gradient of the regulating signal S13 may result both from an increase in the desired value signal S1 and from a reduction of the load current, for example when the load is increased.

In order to deactivate the current regulating arrangement, a switch SW1 is provided between the drive circuit 12 and the semiconductor switch T11 in the exemplary embodiment in accordance with FIG. 2.

Figure 5:
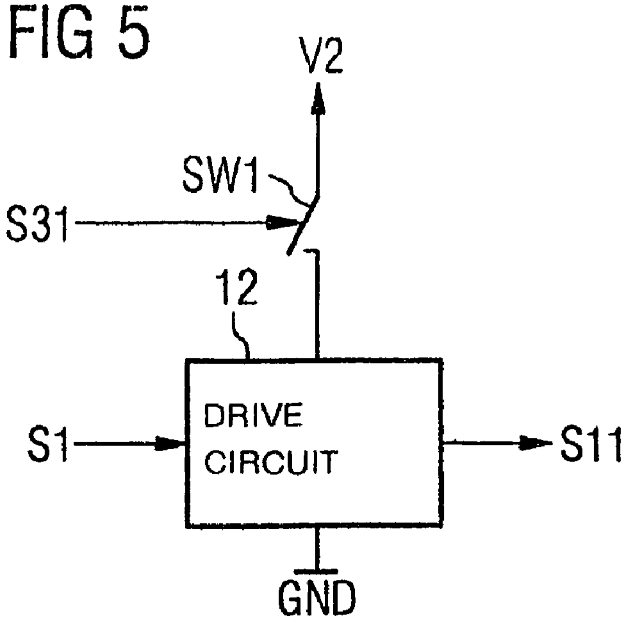
FIG. 5 illustrates a further possibility for deactivating the current regulating arrangement by switching off the drive circuit.

With reference to FIG. 5, for deactivating the current regulating arrangement 10, there is also the possibility of interrupting a voltage supply of the drive circuit 12, said voltage supply not being specifically illustrated in FIG. 2. For this purpose, the switch SW1 is connected between a supply potential V2 and the supply terminal of the drive circuit 12, said switch being driven by the first activation/deactivation signal S31 in the manner already explained.

Figure 6:
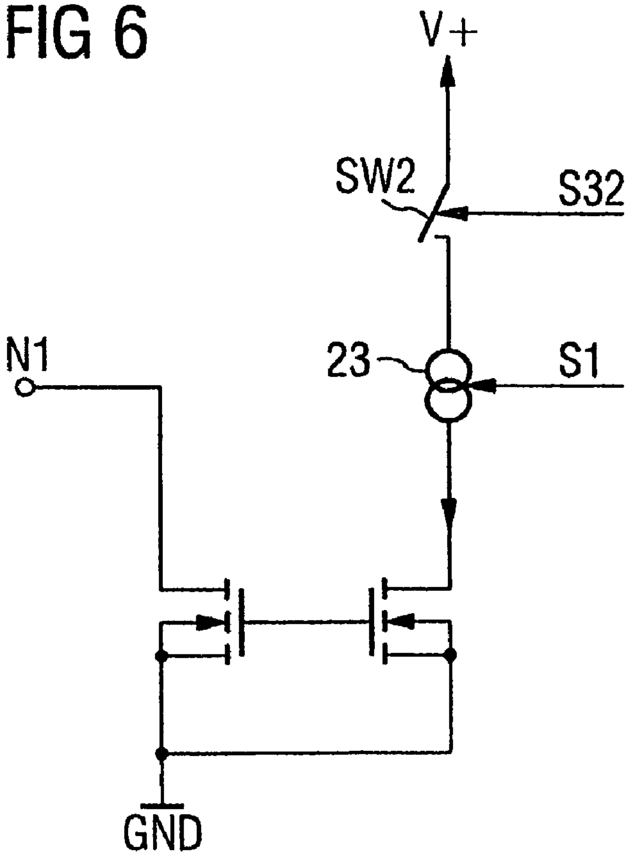
FIG. 6 illustrates a further possibility for deactivating the current mirror arrangement in accordance with FIG. 2.

For activating or deactivating the current mirror arrangement 20, there is correspondingly the possibility of connecting the switch SW2 between the current source 23 and the supply potential V1, as is illustrated in FIG. 6. This switch SW2 is driven by the second activation/deactivation signal S32 in the manner already explained.

It should be pointed out that, in addition to the switching regulator illustrated in FIG. 2, it is possible, of course, to use any desired further activatable and deactivatable current regulating arrangements in the current supply circuit according to the invention. Moreover, in addition to the current mirror arrangement explained in FIG. 2, it is possible to use any desired further activatable and deactivatable unregulated, but adjustable current source circuits in the current supply circuit.

It is possible, of course, to use any desired current measuring arrangements for providing the current measurement signal S2. With reference to FIGS. 1 and 2, it should be pointed out that this current measuring arrangement need not necessarily be connected into the load current path. Thus, there is also the possibility, in the case of a switching regulator, of detecting this current according to the so-called current sense principle, in the case of which, in addition to a load transistor (transistor T11 in FIG. 2), provision is made of an auxiliary transistor that is ideally operated at the same operating point as the load transistor and consequently has a current flowing through it that is proportional to the current through the load transistor. This current through the auxiliary transistor, which usually has a substantially smaller area than the load transistor, can be evaluated for the purpose of generating the current measurement signal.

LIST OF REFERENCE SYMBOLS

10 Current regulating arrangement
12 Drive circuit
13 Regulator
14 Pulse width modulator
20 Current source arrangement
23 Current source
40 Current measuring arrangement
131 Differential element
132 Integrator
141 Sawtooth generator
144 RS flip-flop
142,143 Comparators
GND Reference-ground potential
I11 Regulated current
I21 Current source current
I22 Current source current
IL Load current
IN Input terminal
INV Inverter
K30 Comparator
L Inductance
N1 Output terminal
R Resistor
S1 Desired value signal
S11 Drive signal
S13 Regulating signal
S14 Sawtooth signal
S15 Reference signal
S2 Current measurement signal
S3 Limit value signal
S31,S32 Activation/deactivation signal
SW1 Switch
SW2 Switch
T11 Semiconductor switch, n-conducting MOSFET
T21,T22 Current mirror transistors, n-conducting MOSFETs
V1,V2 supply potential
Z load

The invention claimed is:

1. A current supply circuit, comprising:

an input operably connected to receive a first value signal;

a load terminal operably connected to provide a load current through a load, the load current dependent on the first value signal;

a selectively activatable current regulator, the current regulator operably coupled to receive the first value signal and, based on the first value signal, cause a first current to be provided through the load as at least a portion of the load current when the current regulator is activated;

a selectively activatable adjustable current source, the adjustable current source operably coupled to receive the first value signal and, based on the first value signal, causes a second current to be provided through the load as at least a portion of the load current when the adjustable current source is activated; and a comparator circuit operably coupled to receive the first value signal and a second value signal, the comparator circuit operable to generate a comparison of the first value signal and the second value signal, the comparator circuit further operable to cause selective activation of one of the current regulator or the adjustable current source based on the comparison.

2. The current supply circuit as claimed in claim 1, wherein the comparator circuit is further operable to activate the current regulator if the first value signal exceeds the second value signal, and to activate the current source if the second value signal exceeds the first value signal.

3. The current supply circuit as claimed in claim 2, wherein the comparator circuit is further operable to activate the current regulator if the first value signal exceeds the second value signal and a first hysteresis condition is met, and to activate the current source if the second value signal exceeds the first value signal and a second hysteresis condition is met.

4. The current supply circuit as claimed in claim 1, wherein the comparator circuit is further operable to cause selective activation of one of the current regulator or the adjustable current source based on the comparison and a hysteresis condition.

5. The current supply circuit as claimed in claim 1, wherein the comparator circuit comprises a digital circuit.

6. The current supply circuit as claimed in claim 1, wherein:

the adjustable current source includes a current mirror circuit having a first current path and a second current path, the second current path operably coupled to the load terminal;

the adjustable current source is operable to provide a current in the first current path, the current dependent on the first value signal; and the current mirror circuit is operable to couple the current to the second current path to form the second current.

7. The current supply circuit as claimed in claim 6, wherein the adjustable current source is configured to be selectively switched on and off to selectively activate and deactivate, respectively, the adjustable current source.

8. The current supply circuit as claimed in claim 1, wherein the current regulator is further operable to receive a current measurement signal representative of the load current, the current regulator operable to regulate the first current based at least in part on the current measurement signal.

9. The current supply circuit as claimed in claim 8, wherein the current regulator comprises:

a semiconductor switch having a load path and a control terminal, the load path operably connected to the load terminal, and a drive circuit operably coupled to receive the first value signal and the current measurement signal, the drive circuit configured to provide a clocked drive signal for the semiconductor switch, the duration of switch on periods of the drive signal being dependent on the first value signal and the current measurement signal.

10. The current supply circuit as claimed in claim 9, wherein the current regulator further includes a switch operably coupled between the drive circuit and the semiconductor switch, the switch operable to effect selective activation and deactivation of the current regulator.

11. The current supply circuit as claimed in claim 9, wherein the drive circuit comprises:

a regulator operable to provide a regulating signal based at least in part on the first value signal and the current measurement signal, and a pulse width modulator operably coupled to receive the regulating signal, the pulse width modulator operable to provide the drive signal in the form of a pulse-width-modulated signal having a pulse duration dependent on the regulating signal.

12. A method for supplying a load with current dependent on a first value signal, comprising:

a) employing a selectively activatable current regulator, the current regulator operably coupled to receive the first value signal and, based on the first value signal, cause a first current to be provided through the load when the current regulator is activated;

b) employing a selectively activatable adjustable current source, the adjustable current source operably coupled to receive the first value signal and, based on the first value signal, cause a second current to be provided through the load when the adjustable current source is activated; and c) selectively activating one of the current regulator or the adjustable current source based at least in part on a comparison of a second value signal with the first value signal.

13. The method as claimed in claim 12, wherein step c) further comprises selectively activating one of the current regulator or the adjustable current source based in part on a hysteresis condition.

14. The method as claimed in claim 13, wherein step a) further comprises providing a current measurement signal to the current regulator, the current measurement signal dependent on the current flowing through the load.

15. The method as claimed in claim 12, wherein step a) further comprises providing a current measurement signal to the current regulator, the current measurement signal dependent on the current flowing through the load.

16. The method as claimed in claim 15, wherein step a) further comprises employing the current regulator such that the current regulator comprises a switching regulator.

17. The method as claimed in claim 12, wherein step a) further comprises employing the current regulator such that the current regulator comprises a switching regulator.

18. The method as claimed in claim 17, wherein step b) further comprises employing a current mirror within the adjustable current source.

19. The method as claimed in claim 12, wherein step b) further comprises employing a current mirror within the adjustable current source.

20. The method as claimed in claim 16, wherein step b) further comprises employing a current mirror within the adjustable current source.

* * * * *